UNITED STATES PATENT OFFICE.

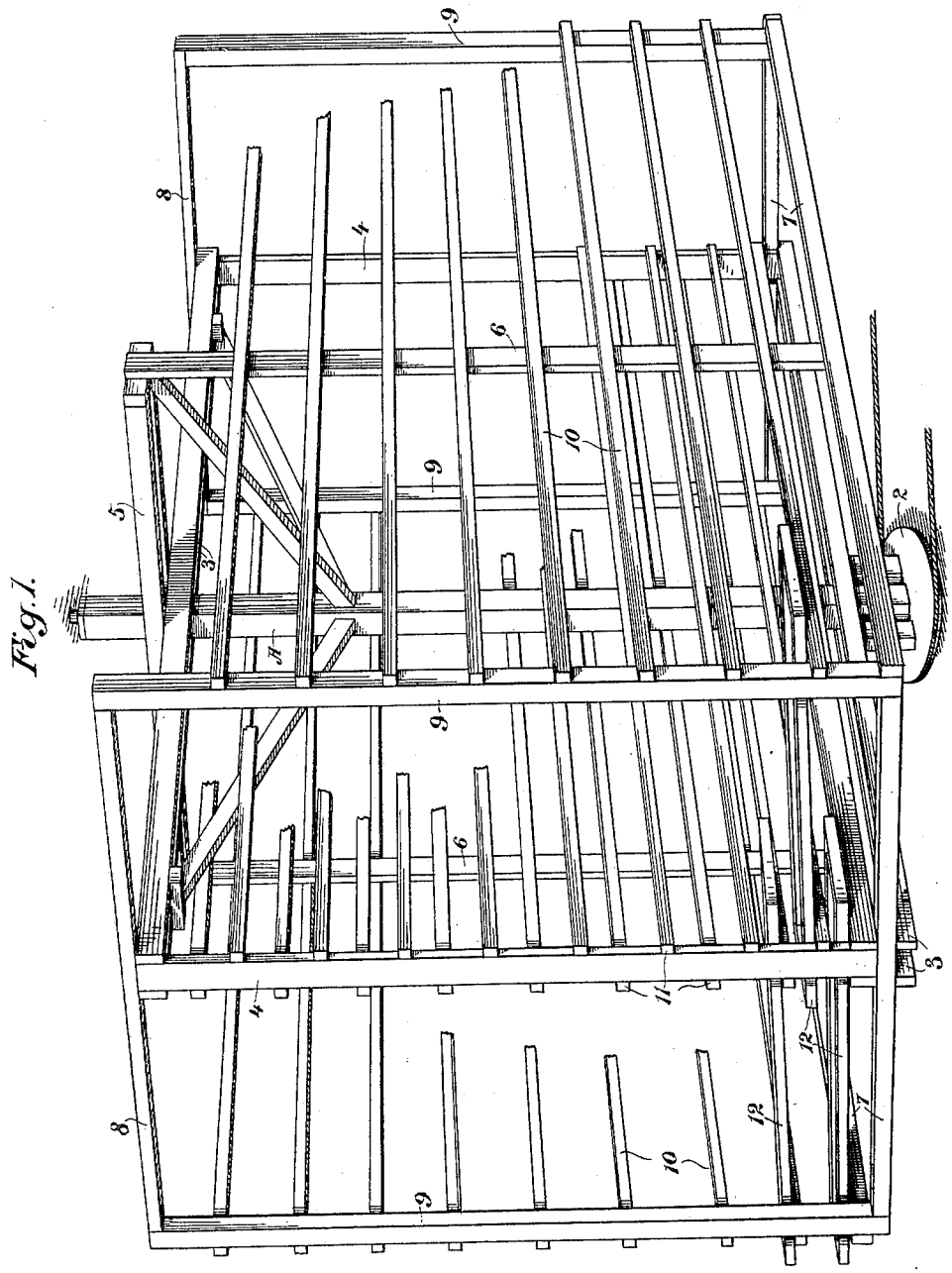

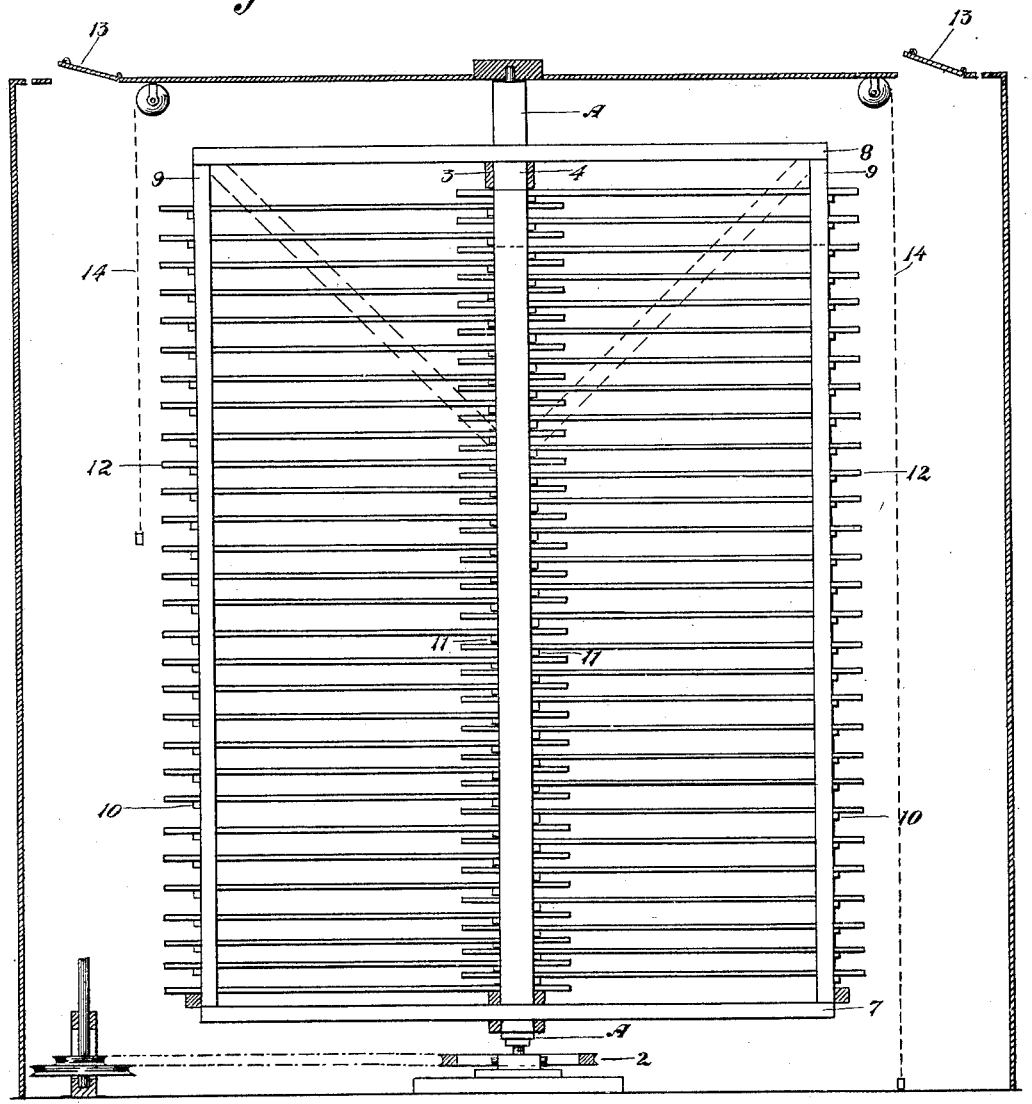

CAESAR R. SPLIVALO, OF SAN FRANCISCO, CALIFORNIA.

DRYING APPARATUS.

SPECIFICATION forming part of Letters Patent No. 649,648, dated May 15, 1900.

Application filed February 7, 1900. Serial No. 4,327. (No model.)

*To all whom it may concern:*

Be it known that I, CAESAR R. SPLIVALO, a citizen of the United States, residing in the city and county of San Francisco, State of California, have invented an Improvement in Machines for Drying Alimentary Pastes; and I hereby declare the following to be a full, clear, and exact description of the same.

My invention relates to a machine which is designed for drying alimentary pastes, such as macaroni, vermicelli, and the like.

It consists, essentially, of a vertical rotatable central standard, arms, and an exterior framework carried thereby having bars or supports upon which trays are placed containing the prepared paste, and means for revolving the apparatus, so that the movement through the air will carry away the moisture and gradually desiccate the material to a sufficient dryness.

It also comprises details of construction, which will be more fully explained by reference to the accompanying drawings, in which—

Figure 1 is a view of my machine. Fig. 2 is an end elevation of the same.

In the drying of macaroni, vermicelli, and like edible pastes it has been customary to lay the prepared articles upon strawboard or other suitable support, which in turn rests upon screen-surfaces. These screen-surfaces are formed upon frames making portable trays, which trays when filled with paste are placed in racks, one frame above the other about twelve inches apart, and left to dry either by the action of the atmosphere solely or with the assistance of heat from steam-pipes laid over the floor. This method of drying is open to many objections. First, if solely by action of the atmosphere it is likely either to dry too fast and split up the paste or too slowly and become sour or accumulate mold; second, if with assistance of steam the evaporation cannot be regulated to perfection, and the result is sometimes some pastes will dry too fast and split, or the evaporated moisture may not find its way out of the room fast enough and will settle back on the paste, causing it to become sour or moldy; third, it takes up at least fifty per cent. more space than with my invention. In my invention I have shown a vertical post A, having gudgeons at the top and bottom adapted to be journaled in a suitable step below and support above. Around the lower part of this post is a wheel-pulley 2 or other device, through which motion may be transmitted from a distant motor to rotate the shaft. The shaft is here shown as being square in cross-section, and at the top upon two opposite sides are fixed the bars 3, standing parallel with each other. These bars are connected by vertical strips 4, fixed between the ends of the bars 3 at top and bottom, as shown. Transversely across the opposite side of the post A are secured other bars 5, which stand at right angles with the bars 3, and these bars also have vertical bars 6 extending downward from their outer ends. Extending around the bottom of the structure is a rectangular frame 7, and extending across the ends at the top are bars 8. These bars 7 and 8 are also united by vertical bars 9 at their angles, and horizontal bars 10 extend from along the outer sides of the vertical bars 9, to which they are fixed. Similar bars 11 are fixed to extend from the vertical bars 4 across the center to similar bars upon the opposite side. These bars 11 are parallel with the bars 10, and the bars 10 upon one side stand intermediate with the bars 10 upon the opposite side, the inner bars 11 alternately corresponding and level with these exterior bars, so that the trays 12 can be placed upon the bars, and when the latter are loaded the trays upon one side extend inwardly contiguous to the inner ends of those which are put in from the opposite side. Thus a series of trays extend from one side toward the center line, and a similar series of trays extend from the opposite side to the center line. By this arrangement the trays can be very closely arrranged, greatly economizing the space which is occupied by a large number of trays of material to be dried. The apparatus being loaded, power is transmitted by any suitable means to the pulley or driver 2, and the apparatus is rotated around its vertical axis. This produces horizontal currents of air between the horizontally-disposed trays, so that the moist air arising from the material on the trays is continually swept away transversely and horizontally and is not allowed to rise from one tray to another, which would tend to load the material from some of the trays with the surplus moisture from the others. In my device the centrifugal movement is sufficiently rapid to cause an outward tendency of the air and a continuous circulation of sufficiently-dry air between the trays, this air taking up the moisture from the paste arranged on the trays and continually carrying it outward away from the trays, its place being constantly taken by a fresh supply of air. The operation may be carried on in rooms of sufficient size suitably ventilated, so that a constant circulation of fresh air can be obtained, if desired, or by closing the discharge-doors the moisture which leaves the paste may be retained in the room to any degree, so as to prevent too-rapid drying, and consequent cracking or splitting of the paste. By thus operating the apparatus within a room with doors 13 to regulate the discharge and with movable screens or partitions 14 the moisture from the paste may be retained in the surrounding atmosphere to any desired degree in dry weather or be allowed to escape more or less rapidly. The means for rotating the apparatus is also arranged to increase the speed in damp weather, and thus remove the moisture from the paste more rapidly.

Having thus described my invention, what I claim as new, and desire to secure by Letters Patent, is—

1. A drier including an exterior framework having horizontal tray-supporting bars, trays adapted to be inserted in the framework from opposite sides and having their inner portions overlapping endwise, and a framework interior to the exterior frame and provided with horizontal spaced bars adapted to support the inner ends of said trays, and means for revolving the drier about a vertical axis.

2. The combination with a vertical shaft and means for rotating the same, of longitudinal and cross bars secured to the shaft and horizontal and vertical bars connecting with the ends of the longitudinal and cross bars, a series of spaced bars on the exterior framework and trays inserted into the framework from opposite sides and adapted to have their outer ends supported upon said spaced bars, a corresponding series of spaced bars near the center of the framework and other bars spaced between the last-named bars whereby the inner overlapping ends of the trays are supported.

3. An apparatus for drying alimentary pastes and the like consisting of a vertically-journaled and stepped center post, bars secured across said post at top and bottom and at right angles with each other, exterior frames fixed to the ends of said bars, united at the corners to form rectangles with vertical connecting-bars, horizontal supporting-bars secured thereto, and trays adapted to contain the material to be dried, said trays being supported upon the horizontal bars, and having their inner end overlapping spaced bars at the center of the structure and adapted to support said overlapping ends, and a mechanism whereby the structure is revolved about its vertical axis whereby the trays are constantly moved through the air in horizontal planes.

4. An apparatus for drying alimentary pastes and the like, consisting of horizontally-supported trays, and a slatted framework therefor, a vertical revoluble center post or shaft upon which the frame is carried whereby horizontal currents of air are caused to traverse the trays, means for varying the rate of revolution of the framework, an inclosing chamber, with regulating gates or doors, and adjustable partitions to vary the size of the chamber.

In witness whereof I have hereunto set my hand.

C. R. SPLIVALO.

Witnesses:
FRANK CURRY,
T. H. MARSLAND.